B. F. & J. W. LEWIS.
AUTOMATIC HAY EJECTOR FOR SWEEP RAKES.
APPLICATION FILED SEPT. 9, 1913.
1,093,444.
Patented Apr. 14, 1914.
2 SHEETS—SHEET 1.
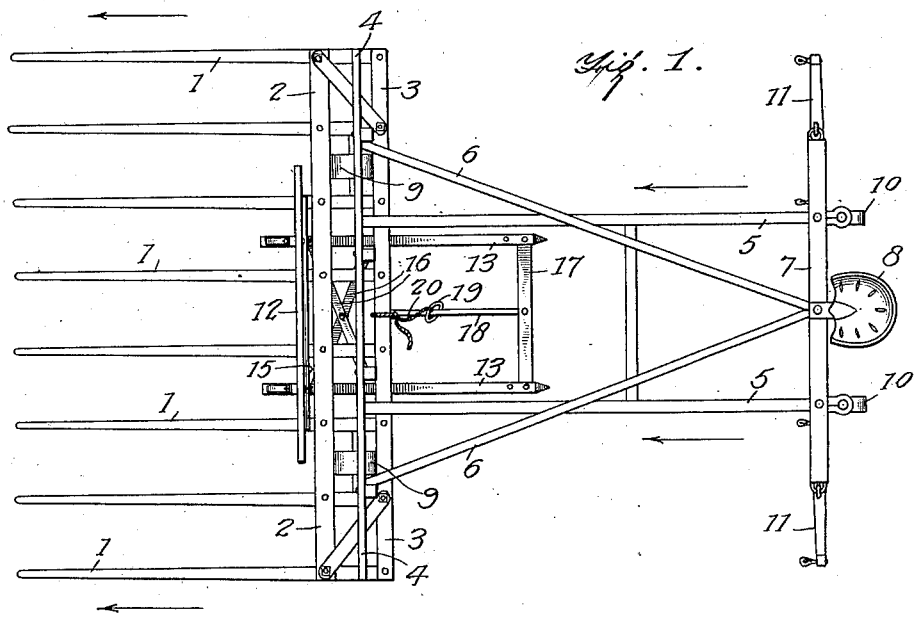
Fig. 1.
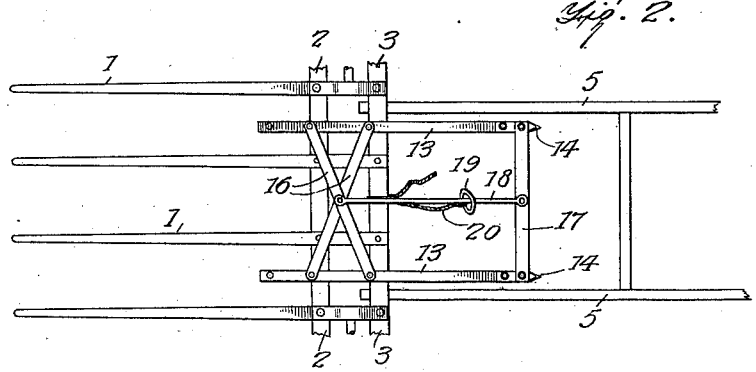
Fig. 2.
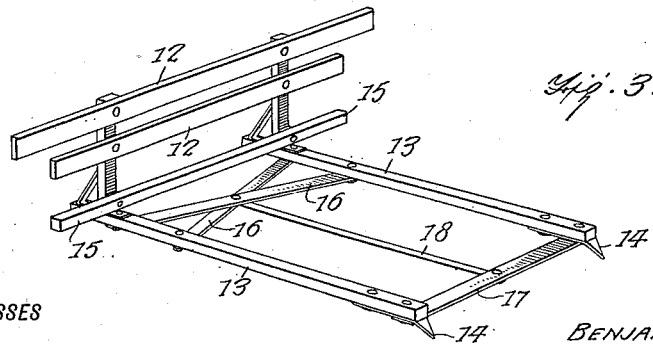
Fig. 3.
WITNESSES
L. H. Schmidt.
Amos W. Hart.
INVENTORS
BENJAMIN F. LEWIS,
JOHN W. LEWIS,
BY 
ATTORNEYS
COLUMBIA PLANOGRAPH CO., WASHINGTON, D. C.

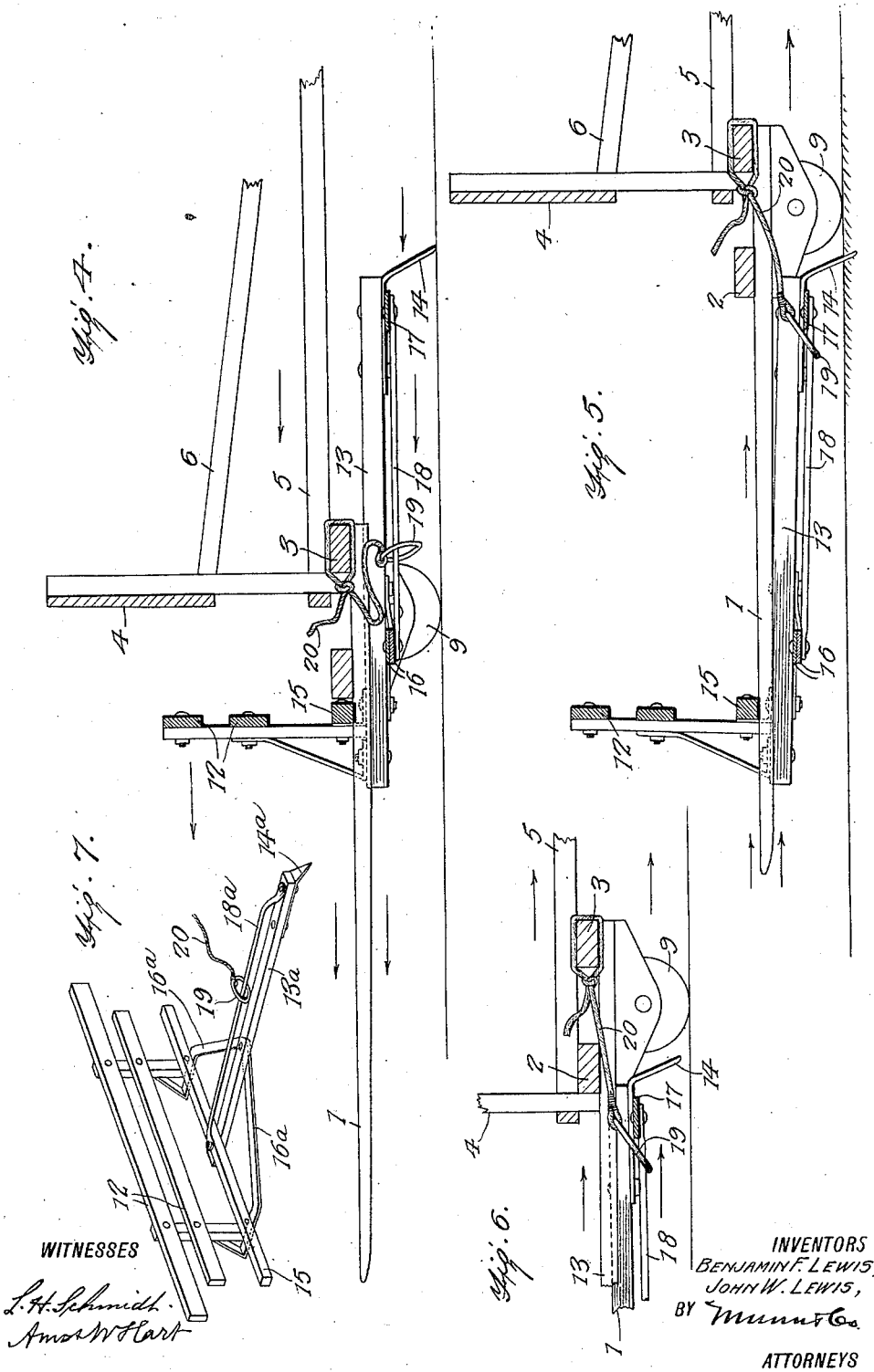

UNITED STATES PATENT OFFICE.

BENJAMIN F. LEWIS AND JOHN W. LEWIS, OF HARTLAND, KANSAS.

AUTOMATIC HAY-EJECTOR FOR SWEEP-RAKES.

1,093,444.  Specification of Letters Patent.  Patented Apr. 14, 1914.

Application filed September 9, 1913. Serial No. 788,780.

*To all whom it may concern:*

Be it known that we, BENJAMIN F. LEWIS and JOHN W. LEWIS, citizens of the United States, and residents of Hartland, in the county of Kearny and State of Kansas, have invented an Automatic Hay-Ejector for Sweep-Rakes, of which the following is a specification.

So-called sweep-rakes or hay-sweeps are extensively used for gathering hay and carrying it to a stacker, and such rakes are commonly provided with hay-ejectors or devices for pushing the hay off the rake, of which an instance appears in United States patent granted to us September 10, 1912, No. 1,038,163.

Our present invention is an improvement upon the former one. In the latter, the hay-ejector or hay-pusher requires to be adjusted manually by the driver of the rake in order to throw it into and out of action, whereas, in the present invention, the action is entirely automatic, thus effecting a considerable saving in time and expense.

The details of construction, arrangement, and operation of the improvement are as hereinafter described, and illustrated in the accompanying drawings, in which—

Figure 1 is a plan view of the sweep-rake and hay-ejector combined. Fig. 2 is a bottom plan view of a portion of the rake, together with the ejector shown complete. Fig. 3 is a perspective view of the ejector. Fig. 4 is a central-vertical, longitudinal section of the main portion of the rake, together with the ejector, the latter being shown in the position it occupies when out of action. Fig. 5 is a vertical, longitudinal section of the same parts showing the ejector near the limit of its relative movement by which it pushes the hay off the rake teeth. Fig. 6 is a vertical longitudinal section showing the position of the rear end of the ejector when the rake has reached the limit of its rearward movement in pushing the hay off the rake. Fig. 7 is a perspective view showing a modification of the rear portion of the ejector.

Referring in the first instance to Fig. 1, the numeral 1 indicates a series of parallel teeth which are attached to, and rigidly connected by, parallel cross-bars 2 and 3. The rake proper is provided with a head 4 formed by means of uprights and a transverse bar or plate, the uprights being attached to the rear cross-bar 3, as shown in Fig. 4. The rake thus formed has a rear extension consisting of parallel bars 5 and diagonal bars 6, as illustrated in Figs. 1 and 4. The rear ends of the bars 5 are connected by transverse bars 7 and the driver's seat 8 is arranged and supported on certain of the bars 7. The rake proper is supported upon small wheels 9 and the rear end of its frame is supported on corresponding wheels 10, as shown in Fig. 1. Horses or other draft animals are attached to swingletrees 11 which are swiveled to the ends of the rear cross-bar 7, and the animals travel in the spaces provided on the sides of the frame 5, thus pushing instead of hauling the rake.

The hay-ejector or hay-pusher, shown detached in Fig. 3, comprises a vertical head 12 formed of posts and cross-bars, and a rear extension comprising parallel bars 13 whose rear ends have downwardly projecting teeth 14 that are adapted to take into the earth, as will be hereinafter described. A bar 15 extends across the lower portion of the head 12, and, in practice, rests and slides upon certain teeth of the rake, as shown in Fig. 1, also in Figs. 4 and 5. The rear extension bars 13 of the hay-ejector are connected near their front ends by crossed bars 16 and at their rear ends by a flat bar 17. Between the centers of the bars 16 and 17 there extends a rod 18 which is preferably riveted to the former and lies practically in the same plane with the under side of bars 13. A ring 19 is adapted to slide on the rod 18, and a rope or other flexible medium 20 connects it with the bar 3 constituting a part of the head of the rake proper. It is to be understood, however, that the rope may be tied or otherwise secured to any portion of the head of the rake.

It will now be understood that, when the rake has become loaded with hay, the pusher or ejector will be forced backward upon the rake against the back thereof, as shown in Figs. 1, 2 and 4, the teeth 14 of the ejector at such time dragging on the ground, as will be understood by reference to Fig. 4, and the rope 20 being slack, as shown in the same figure. When in this position, the ring is on the forward portion of the rod 18, or directly in rear of the crossed bars 16 of the pusher. The filled or loaded rake having reached the stacker, the ejecting operation ensues, it being produced by backing the team which thus draws the rake proper rearward. At this time the teeth 14 of the ejector take into the earth, as represented in Fig. 5, and thus the ejector is held from backward movement along with the rake. The latter being withdrawn farther and farther, the hay is pushed entirely off the teeth 1. When the rake has been withdrawn as shown in Fig. 5, that is to say, nearly as far as the rope 20 permits, without affecting the position of the ejector, the hay has been mostly pushed off the rake teeth, and a continued backward movement of the rake tightens or stretches the rope 20 as shown in Fig. 6, by reason of the ring 19 coming in contact with the rear cross bar 17 of the ejector, which has the effect of raising the rear end of the ejector and thus withdrawing the teeth 14 from the earth and holding that portion of the ejector raised above the earth, as shown in Fig. 6. The ejector remains in this position, that is to say, near the front ends of the rake teeth 1, until the rake again takes up hay sufficient to force the ejector backward to its original inactive position, in other words, against the cross-bar 2 of the rake, as shown in Fig. 4. In other words, the rope 20 is held taut so long as the ejector proper is near the front end of the rake-teeth, and it is apparent that, while taut, the rope supports the rear toothed end of the ejector clear of the ground. On the other hand, so soon as the rake again takes up hay, the latter forces the ejector backward so that the rope 20 is slackened and hence allows the rear end of the ejector to drop by its own weight, which brings its tooth 14 into contact with the ground. Thus it will be seen that the ejector works automatically and that it is raised from the earth, when the hay has been discharged, by reason of the backward movement of the rake and the consequent tension on the rope 20 by which the ring 19 is brought into contact with the rear cross-bar of the ejector, and thereby disengages the teeth 14 from the earth, so that the rake is again adapted for use for gathering hay as before. It will be understood, therefore, that the ejector is not itself moved forward to discharge the gathered hay from the rake teeth, but that the engagement of the ejector teeth 14 with the earth holds it fixed in position while the rake is being withdrawn by backing the team.

In the modification illustrated in Fig. 7, a single bar 13$^a$ and a single tooth 14$^a$ are employed in place of two bars and teeth. This bar is attached to the head of the ejector at the middle of its length and provided with braces 16$^a$ to insure its lateral rigidity. The rod 18$^a$ to which a sliding ring is applied is arranged directly over and secured to the bar 13$^a$. It is obvious that this device operates the same as the ejector first described.

What we claim is:—

1. The combination, with a sweep-rake, of a hay-ejector comprising a frame adapted to slide on the rake and provided at its rear end with earth-engaging teeth, and a flexible means for connecting the rear portion of the ejector with the rake head, said flexible connector being of such length that, when the rake is fully retracted, the teeth of the ejector are raised and disengaged from the earth, as described.

2. The combination, with a sweep-rake, of a hay-ejector comprising a frame adapted to slide on the rake and provided at its rear end with earth-engaging teeth, and a flexible connector between the rake head and ejector, said connector having a fixed attachment to the rake and a sliding attachment to the rear extension of the ejector, said flexible connector being of such length that, when the loaded rake is withdrawn from the load by backing the team, the toothed rear end of the ejector is at first allowed automatically to drop into engagement with the earth, and, when the hay has been ejected or pushed off the rake, the ejector is automatically disengaged from the earth, as described.

3. The combination, with the sweep-rake having a rear frame extension, of a hay-ejector comprising a frame adapted to slide on the rake proper and provided with earth-engaging teeth and also with a rod extending rearward on the under side of the ejector frame, a ring adapted to slide on said rod, a stop arranged at the rear end of the rod with which the ring engages, and a flexible medium connecting said ring with the head of the rake and being of such length as to serve to automatically limit the backward movement of the rake relative to the ejector and to also disengage the latter from the earth when the hay has been fully discharged, as described.

BENJAMIN F. LEWIS.
JOHN W. LEWIS.

Witnesses:
  E. R. SHARK,
  A. E. HARBOLT.